(12) United States Patent
Achleitner et al.

(10) Patent No.: US 10,252,321 B2
(45) Date of Patent: Apr. 9, 2019

(54) TWIST DRILL AND PRODUCTION METHOD

(71) Applicant: HILTI AKTIENGESELLSCHAFT, Schaan (LI)

(72) Inventors: Corinna Achleitner, Sargans (CH); Mark Winkler, Hohenems (AT); Guenter Domani, Weissensberg (DE); Carsten Peters, Sax (CH)

(73) Assignee: HILTI AKTIENGESELLSCHAFT, Schaan (LI)

( * ) Notice: Subject to any disclaimer, the term of this patent is extended or adjusted under 35 U.S.C. 154(b) by 49 days.

(21) Appl. No.: 15/519,970

(22) PCT Filed: Oct. 20, 2015

(86) PCT No.: PCT/EP2015/074206
§ 371 (c)(1),
(2) Date: Apr. 18, 2017

(87) PCT Pub. No.: WO2016/062683
PCT Pub. Date: Apr. 28, 2016

(65) Prior Publication Data
US 2017/0348760 A1  Dec. 7, 2017

(30) Foreign Application Priority Data
Oct. 23, 2014  (EP) .................................. 14190033

(51) Int. Cl.
| | | |
|---|---|---|
| *B21H 3/10* | (2006.01) | |
| *B28D 1/14* | (2006.01) | |
| *B23B 51/02* | (2006.01) | |

(52) U.S. Cl.
CPC ............... *B21H 3/10* (2013.01); *B23B 51/02* (2013.01); *B28D 1/146* (2013.01);
(Continued)

(58) Field of Classification Search
CPC ....... B21H 3/10; B23B 51/02; B23B 2226/75; B23B 2251/204; B23B 2251/408; B23B 2251/241; B28D 1/146
(Continued)

(56) References Cited

U.S. PATENT DOCUMENTS

| | | | | |
|---|---|---|---|---|
| 302,600 A | * | 7/1884 | Stetson ................... | B21H 3/048 72/104 |
| 320,967 A | * | 6/1885 | Richards ................ | B21D 51/24 72/340 |

(Continued)

FOREIGN PATENT DOCUMENTS

| | | |
|---|---|---|
| CN | 1359770 A | 7/2002 |
| DE | 11 04 481 B | 4/1961 |

(Continued)

OTHER PUBLICATIONS

Chinese Patent Office, Office Action in counterpart Chinese Application No. 201580057231.9, dated May 22, 2018.
(Continued)

*Primary Examiner* — Hwei-Siu C Payer
(74) *Attorney, Agent, or Firm* — Leydig Voit & Mayer

(57) ABSTRACT

A method for producing a twist drill has the following steps. A blank is shaped to form a semi-finished product. The semi-finished product is formed from a core, coaxial with the drill axis, having a radius and a number of webs, arranged on the core, having a height. The semi-finished product has a constant cross section along the drill axis. The webs have a first portion which adjoins the core and in which a width of the web remains constant or decreases in the circumferential direction with increasing radial distance from the drill axis. The webs have a second portion which adjoins the first portion and in which the width of the web increases in the circumferential direction with increasing radial distance from the drill axis. The webs of the semi- (Continued)

finished product are shaped into helical segments using a plurality of rolling tools that annularly enclose the semi-finished product and roll on the webs along the drill axis. The rolling tools have teeth that are inclined with respect to the drill axis. A height of the helical segments is less than the height the webs. Helical segments formed from adjacent webs are in contact with one another in a closing fold. The invention also relates to a twist drill.

15 Claims, 4 Drawing Sheets

(52) U.S. Cl.
CPC ..... *B23B 2226/75* (2013.01); *B23B 2251/204* (2013.01); *B23B 2251/241* (2013.01); *B23B 2251/408* (2013.01)

(58) Field of Classification Search
USPC ........................................................ 76/108.6
See application file for complete search history.

(56) References Cited

U.S. PATENT DOCUMENTS

| | | | | |
|---|---|---|---|---|
| 1,151,247 | A * | 8/1915 | Denk | B21B 19/02 72/109 |
| 1,543,608 | A * | 6/1925 | Leidecker | B21K 5/04 72/371 |
| 2,533,227 | A * | 12/1950 | Delaney | B21H 3/00 72/237 |
| 2,985,041 | A * | 5/1961 | Hayden | B21H 3/00 72/134 |
| 3,610,075 | A * | 10/1971 | Fabish | B24B 3/045 451/48 |
| 6,431,962 | B1 * | 8/2002 | George | B23B 51/02 451/47 |
| 6,540,452 | B1 * | 4/2003 | Bolkart | B21K 5/02 408/230 |
| 7,628,232 | B2 * | 12/2009 | Koch | B23B 51/02 175/323 |
| 9,656,331 | B2 * | 5/2017 | Mehrotra | B23C 3/32 |
| 2004/0101379 | A1 * | 5/2004 | Mabuchi | B23B 51/02 408/230 |
| 2005/0126829 | A1 * | 6/2005 | Meierhofer | B23B 51/02 175/395 |
| 2016/0074945 | A1 * | 3/2016 | Achleitner | B23B 51/02 408/230 |
| 2017/0348760 | A1 * | 12/2017 | Achleitner | B23B 51/02 |
| 2018/0171721 | A1 * | 6/2018 | Domani | B23B 51/02 |

FOREIGN PATENT DOCUMENTS

DE     100 53 343 A1    5/2002
WO    WO 2013/060491 A1    5/2013

OTHER PUBLICATIONS

European Patent Office, European Search Report in European Application No. 14 19 0033, dated Apr. 2, 2015.
International Bureau, International Search Report in International Application No. PCT/EP2015/074206, dated Jan. 22, 2016.

* cited by examiner

TWIST DRILL AND PRODUCTION METHOD

CROSS-REFERENCE TO RELATED APPLICATIONS

This patent application is the U.S. National Stage of International Patent Application No. PCT/EP2015/074206, filed Oct. 20, 2015, which claims the benefit of European Patent Application No. 14190033.2, filed Oct. 23, 2014, which are each incorporated by reference.

FIELD OF THE INVENTION

The present invention relates to a method for producing a twist drill and a twist drill which has a plurality of helical ridges.

BRIEF SUMMARY OF THE INVENTION

The production method according to the invention has the following steps. A blank is shaped to form a semi-finished product. The semi-finished product is formed from a core, coaxial with the drill axis, having a radius and a number of ridges arranged on the core and having a height. The semi-finished product has a constant cross section along the drill axis. The ridges have a first portion which adjoins the core and in which a width of the ridge remains constant or decreases in the circumferential direction with increasing radial distance from the drill axis. The ridges have a second portion which adjoins the first portion and in which the width of the ridge increases in the circumferential direction with increasing radial distance from the drill axis. The ridges of the semi-finished product are shaped into helical segments using a plurality of rolling tools that annularly enclose the semi-finished product and roll on the ridges along the drill axis. The rolling tools have teeth that are inclined with respect to the drill axis. The height of the helical segments is less than the height of the ridges. Helical segments formed from adjacent ridges are in contact with one another in a closing fold.

The shaping of the blank takes place in at least two stages. During a first stage the material of the preferably cylindrical blank is pushed together out of an angular portion to form ridges. The resulting ridges have a mushroom-shaped configuration, of which the outer head contains a large amount of material. During a second stage the ridge is rolled longitudinally. The material from the head is pushed back again, guided by the rolling tool, into the previously exposed angular portion. The inclined teeth push the material on one side and prevent a material flow into the subsequent helical turns. As a result, the material accumulates in the helical segments. Adjacent rolling tools push both parts of the material into an angular region lying between the ridges to be shaped. The two helical segments butt against one another in the circumferential direction and form a continuous helix. A closing fold, at which the segments butt against one another, remains in the helix.

The closing folds can lie in planes that contain the drill axis and are arranged centrally between adjacent ridges. The material flow from both ridges in and counter to a rotation direction is approximately the same due to a symmetrical design of the rolling tools.

The top of the ridge preferably contains a large amount of material that can be redistributed during the rolling of the helical segments. One embodiment provides that in cross section a surface of the first portion is smaller than a surface of the second portion.

The head projects in the radial direction over the helix to be produced so that the rolling tools can redistribute material over the entire length of the ridge into the angular region between the ridges. The height of the ridges is preferably at least 20% greater and at most 100% greater than the height of the helical segments.

An embodiment provides that the number of ridges is equal to or greater than the number of helix spines. The number is preferably equal.

A twist drill according to the invention has a drilling head and a helix. The helix contains a cylindrical core defining a drill axis and a number of helical ridges connected to the core. The helical ridges are in each case formed of a plurality of assembled segments that are in contact with one another along closing folds extending parallel to the drill axis. The closing folds can lie in a plane containing the drill axis. In the case of a helix, the core corresponds in the usual sense to the largest cylinder that can be inscribed in the helix.

An embodiment provides that the height of the closing fold is equal to the height of the helical ridge. The closing fold begins at the cylindrical core.

An embodiment provides that segments of a first of two groups of segments are delimited by a flank facing in the direction of rotation of the twist drill and one of the closing folds and segments of a second of the two groups of segments are delimited by a flank facing counter to the direction of rotation and one of the closing folds.

BRIEF DESCRIPTION OF THE SEVERAL VIEWS OF THE DRAWING(S)

The following description explains the invention with reference to exemplary embodiment and drawings. In the drawings.

Elements which are the same or perform the same function are indicated by the same reference numerals in the drawings, unless otherwise stated.

DETAILED DESCRIPTION OF THE INVENTION

Figure 1:
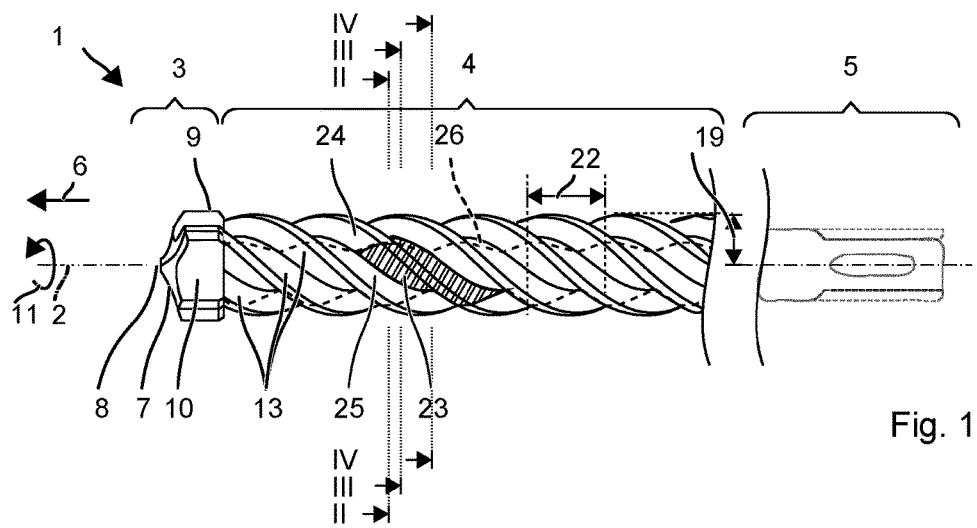
FIG. 1 shows a twist drill.

FIG. 1 shows a schematically simplified representation of a twist drill 1 by way of example. The twist drill 1 has a drilling head 3, a spiral helix 4 and an insertion end 5 successively along a drill axis 2.

The illustrated twist drill 1 is designed for processing stone, in particular for a chiseling action superimposed on the rotary motion. The drilling head 3 has four chisel edges 7 facing in the impact direction 6. The chisel edges 7 are in each case formed as a line of intersection of a leading surface in the direction of rotation of the twist drill 1 and a trailing surface, which are both inclined relative to the drill axis 2 and are inclined relative to one another by at least 60°. The chisel edges 7 extend substantially in the radial direction, for example starting from a tip 8 of the drill head 3 as far as a margin of the drilling head 3, where the chisel edges 7 are preferably recessed relative to the tip 8 in the impact direction 6. An inclination of the chisel edges 7 relative to the drill axis 2 can be constant in the radial direction or can be less in the region of the tip 8 than at the edge. In particular, the chisel edge 7 at the margin can extend perpendicular to the drill axis 2. The chisel edges 7 facing in the impact direction 6 are adjoined at the margin of the drilling head 3 by a cutting edge 9, which extends parallel to the drill axis 2. The cutting edge 9 preferably projects radially beyond the helix 4. The drilling head 3 is provided on its circumference with removal grooves 10 which extend parallel to the drill axis 2 and along which the drill cuttings can be transported out of the drilled hole. The removal grooves 10 are arranged between the chisel edges 7 in the circumferential direction 11. The drilling head 3 is preferably a monolithic body made of sintered hard metal which contains, for example, tungsten carbide and a metal binder. The illustrated drilling head 3 has two pairs of differently configured chisel edges, of which the chisel edges forming the tip 8 are designated as the main cutters and the other pair are designated as secondary cutters. Instead of four chisel edges, the chisel body can also have two chisel edges, for example only the main cutters, or three or more than four chisel edges.

The helix 4 is made up of a solid cylindrical helix core 12 and four helical ridges 13 winding around the helix core 12. The helix core 12 and the helical ridges 13 are connected to one another seamlessly. A division of the helix 4 into the helix core 12 and the helical ridges 13 takes place based upon the characteristic shapes thereof. The helical ridges 13 define the entire surface of the helix 4. The helical ridges 13 have a flank 16 rising from a helix base 14 to a helix spine 15 in the circumferential direction 11 and a flank 17 falling in the circumferential direction 11. The distance of the helix base 14 from the drill axis 2 is the inner radius 18 of the helix 4 and the distance of the helix spine 15 from the drill axis 2 is the outer radius 19 of the helix 4. The cylinder with the inner radius 18, i.e. the largest cylinder that can be inscribed in the helix 4, is the helix core 12. The volumes between the surface and the helix core 12 are associated with the helical ridges 13. The height 20 of the helical ridges 13 is the difference between the outer radius 19 and the inner radius 18 of the helix.

The helix 4 has three, four, five or six helical ridges 13. The helical ridge 13 is preferably configured identically. In the case of four helical ridges 13, for example, two helical ridges can have a smaller height than the other two helical ridges 13. The helical ridges 13 are preferably distributed uniformly about the drill axis 2. The angular spacing 21 of the helical ridges 13, measured in a cross section (FIG. 2) perpendicular to the drill axis 2, is the fraction of the full circle corresponding to the number of helical ridges 13, for example 90 degrees. The helix 4 has a whole-number rotational symmetry, e.g. four-fold rotational symmetry. The pitch 22 of the helix 4 is the axial distance between two adjacent helical ridges 13, measured in a longitudinal section parallel to the drill axis 2. The pitch 22 is preferably constant. The helix 4 is correspondingly periodic along the drill axis 2.

Figure 2:
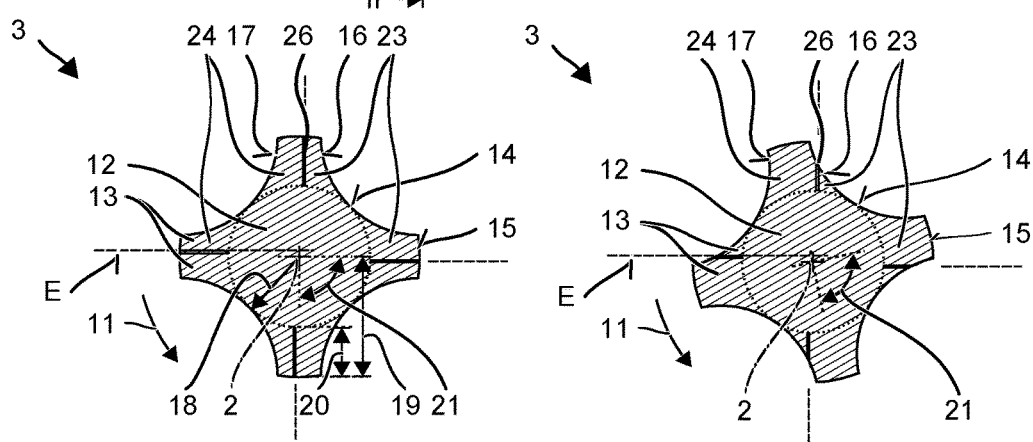
FIG. 2 shows a cross section through a helix of the twist drill in the plane II-II.
Figure 3:
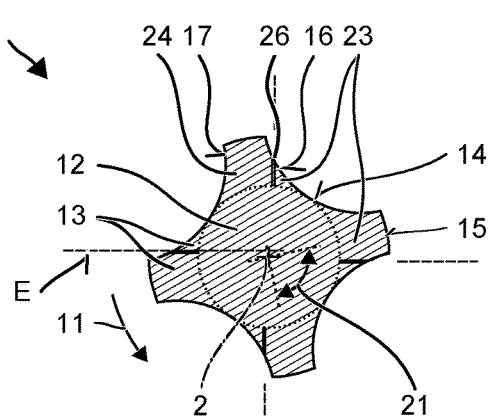
FIG. 3 shows a cross section through a helix of the twist drill in the plane
Figure 4:
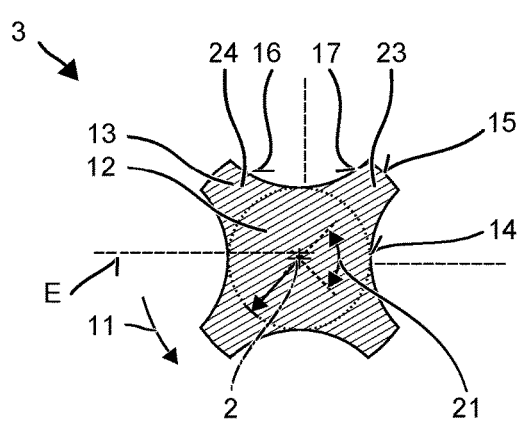
FIG. 4 shows a cross section through a helix of the twist drill in the plane IV-IV.

FIG. 2 shows a first cross section through the helix 4, FIG. 3 shows a second cross-section offset by approximately an eighth of the pitch 22 with respect to the first cross section, and FIG. 4 shows a third cross section offset by approximately half of the pitch 22 with respect to the first cross section. The exemplary helix 4 rotates from the first cross section to the second cross section by approximately 12°, and from the first cross section to the third cross section by 45°.

The helical ridges 13 are divided multiple times both in the circumferential direction 11 and also along the drill axis 2 into segments 23, 24, 25. An exemplary segment 23 is shown cross-hatched in FIG. 1. In the exemplary drill the segments 23, 24, 25 are configured identically. The segments 23 adjoin one another in the circumferential direction 11 and along the drill axis 2. The segments 23, 25 that are adjacent along the drill axis 2 are associated with different helical ridges 13. Along the drill axis 2 the segments 23 are delimited by the helix base 14.

The division of the helical ridges 13 into the segments 23, 24 takes place in the circumferential direction 11 by closing folds 26, which extend over the entire length of the helix 4 and the entire height 20 of the helical ridges 13. The closing folds 26 are largely flat and lie in four planes E. The planes E are parallel to the drill axis 2 and can contain it as required or can be at a distance from the drill axis 2 that is significantly smaller than the inner radius 18, for example smaller than 10% of the inner radius 18. The planes E are at the same angles, e.g. perpendicular to one another.

The adjacent segments 23, 24 are in contact with one another in the closing fold 26. The closing fold 26 constitutes an interruption in the material structure from one of the segments 23 to the adjacent segment 24. However, the two segments 23 are mechanically in contact, i.e. touching one another. There is no air gap between the segments 23, 24. The closing fold 26 can be made visible, for example, in a cut transversely with respect to the drill axis 2. The closing fold 26 can be accentuated, for example, by etching of the cut.

The production method described below for the twist drill 1 relates primarily to the production of the helix 4. The described fabrication of the insertion end 5 and the production or the attachment of the drilling head 3 are only preferred examples.

Figure 5:
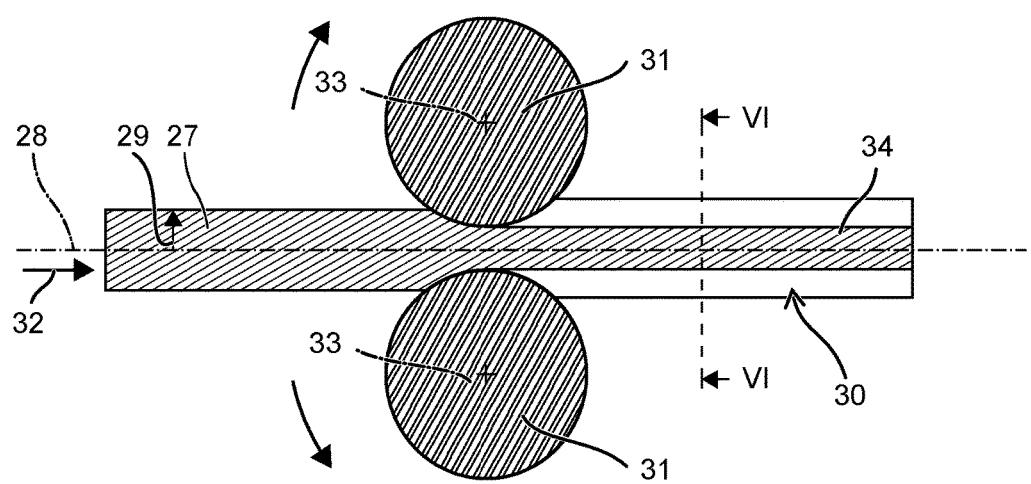
FIGS. 5, 6 show a roll stand.
Figure 6:
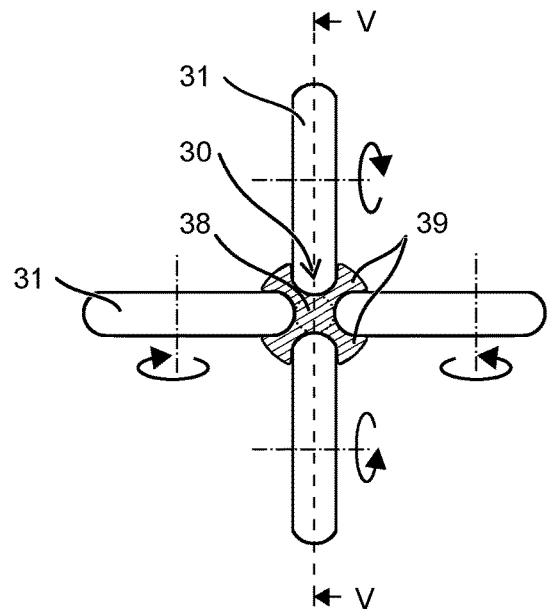

FIGS. 5, 6 show schematically a machining step of a blank 27 in longitudinal section V-V or cross section VI-VI. The blank 27 is, for example, a cylindrical wire with a constant radius 29 along the blank axis 28. For the purpose of simpler procurement, the cross section of the blank 27 is preferably circular, but can also have a different approximately circular configuration, for example polygonal or oval. The described production method cuts the blank 27 to a required length, e.g. the length of the helix 4 or the length of the twist drill 1 including the insertion end 5, before the subsequent shaping steps. In a preferred variant, the helix 4 is first of all formed in the blank 27 and subsequently the helix 4 is cut to the required length.

A first shaping stage forms a plurality of longitudinal grooves 30 in the blank 27. For example, the four longitudinal grooves 30 are rolled into the blank 27 by a roll stand with four rotating rolling tools 31. The rolling preferably takes place by longitudinal rolling, during which the blank 27 is introduced between the rolling tools 31 in a direction of advance 32 parallel to the blank axis 28. The rolling tools 31 rotate about axes 33 which are perpendicular to the direction of advance 32. The longitudinal grooves 30 have a constant cross section along the blank axis 28. The longitudinal grooves 30 preferably have an identical shape and are uniformly distributed around the blank axis 28. The semi-finished product 34 produced from the blank 27 has a corresponding four-fold symmetry about the blank axis 28 to the cross section.

Figure 7:
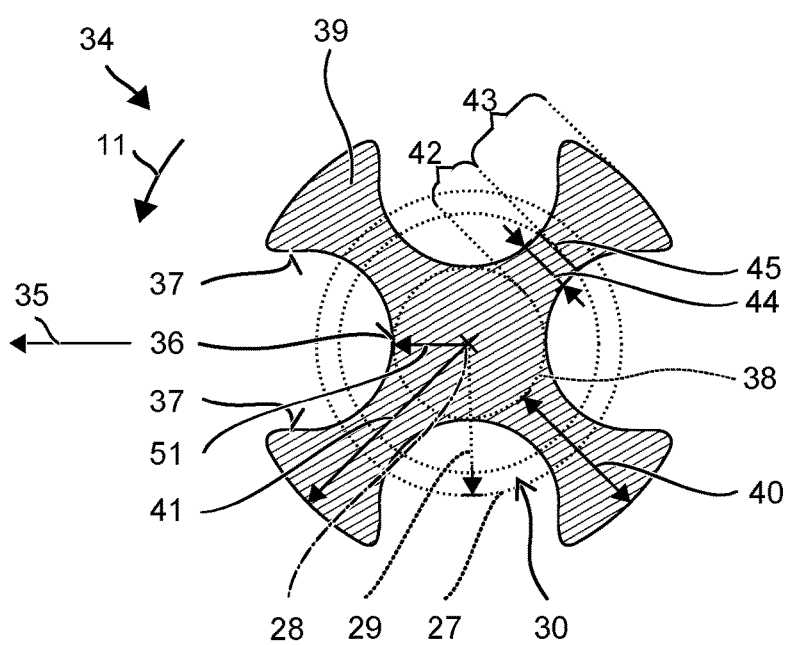
FIG. 7 shows a semi-finished product in cross section.

FIG. 7 shows a cross-section through the semi-finished product 34. The outline of the original blank 27 is illustrated as a dotted line. The longitudinal groove 30 is open in a direction 35 perpendicular to the drill axis 2. The longitudinal groove 30 widens continuously with the increasing distance from the drill axis 2. The longitudinal groove 30 has a base 36 and two opposing walls 37. As described, the base 36 can be continuously circular or curved elliptically or planar in a central region. The walls 37 are largely planar. The exemplary walls 37 are parallel to one another and to the direction 35. The walls 37, slightly inclined relative to one another, can also move away from one another with increasing distance from the blank axis 28.

The semi-finished product 34 consists of a cylindrical core 38 and four ridges 39. The radius 51 of the core 38 is equal to the distance from the base 36 of the longitudinal grooves 30 to the blank axis 28. The ridges 39 are produced by the shaping. The height 40 of the ridges 39 is equal to the difference between the radius 51 and the outer radius 41 of the semi-finished product 34.

The ridges 39 preferably have the same shape, which is formed between the longitudinal grooves 30. The ridges 39 are in the shape of a mushroom or a trumpet. The ridge 39 has an inner portion 42, which adjoins the core 38, and an outer portion 43, which adjoins the side of the inner portion 42 remote from the core 38. The ridge 39 has a width 44 that is dependent upon the distance from the blank axis 28. The width 44 designates the dimension in the circumferential direction 11 as a linear dimension, i.e. the distance between two points that lie on opposing surfaces, are in a plane perpendicular to the blank axis 28 and at the same distance from the blank axis 28. In the inner portion 42 the width 44 decreases continuously with the increasing distance from the blank axis 28. The ridge 39 has a waist 45, i.e. a thinnest point. The inner portion 42 ends at the waist 45. The outer portion 43 is the rest of the ridge 39 outside the waist 45, i.e. at a greater distance from the blank axis 28 than the waist 45. The width 44 increases in the outer portion 43 adjoining the waist 45. The maximum width of the outer portion 43 is 150% to 250% of the width 44 of the waist 45. The distance from the waist 45 to the blank axis 28 is between 80% and 125% of the outer radius 19 of the helix 4 to be produced.

Figure 8:
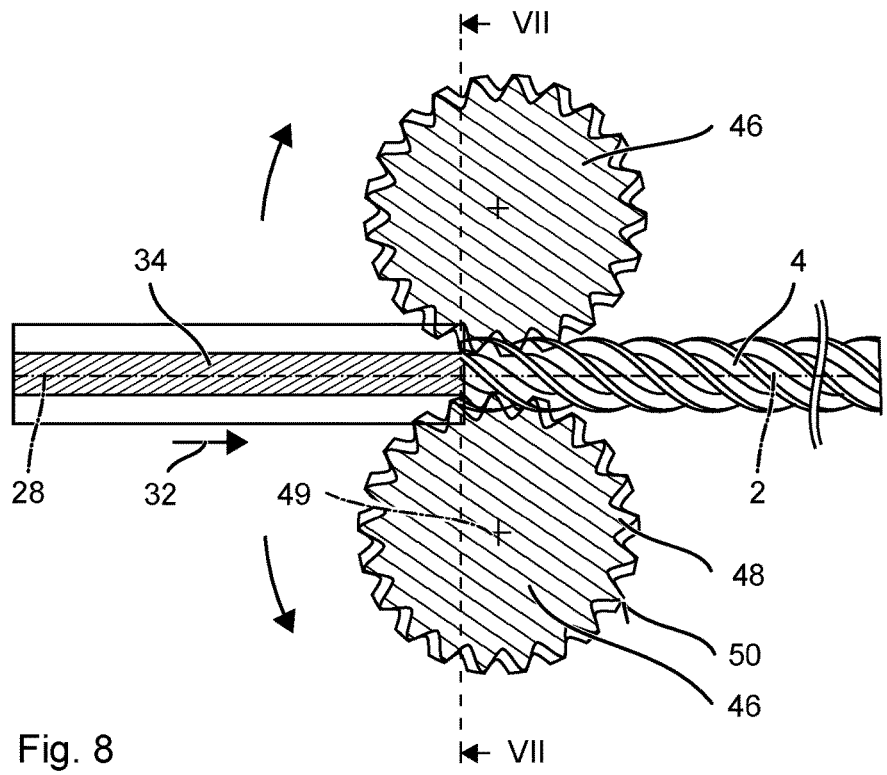
FIGS. 8, 9 show a roll stand.
Figure 9:
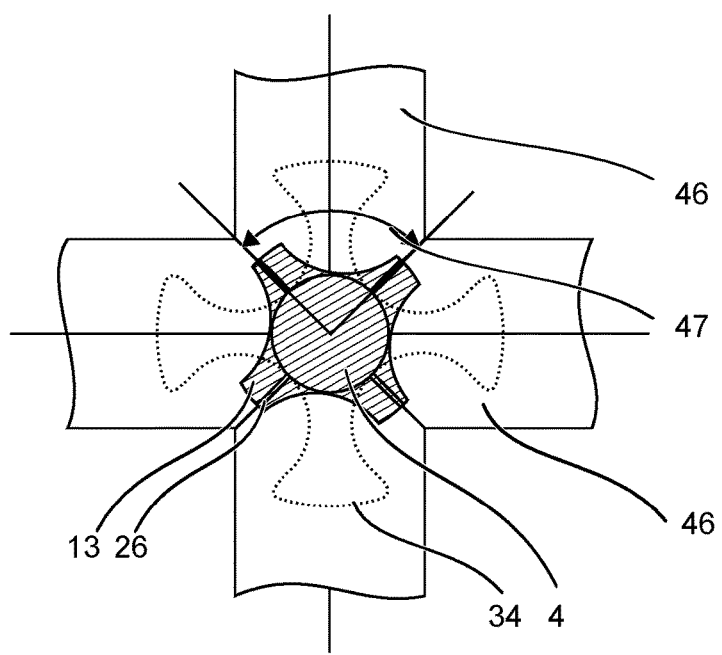

The semi-finished product 34 provided with the ridge 39 is delivered to a second stand with four second rolling tools 46 (FIGS. 8, 9). The second stand rolls the ridges 39 by longitudinal rolling into continuous helical ridges 13, of which four are shown here. The rotation or pivot axes of the rolling tools 46 are perpendicular to the feed direction and drill axis 2 of the semi-finished product 34. The second rolling tools 46 are preferably the same and are arranged around the drill axis 2, preferably at equidistant angles. Each of the rolling tools 46 processes a different angular portion 47 of the semi-finished product 34. The adjacent rolling tools 46 in the circumferential direction 11 are in contact with one another preferably in such a way that the roller surfaces form a closed ring around the drill axis 2 of the semi-finished product 34. An axial portion of the semi-finished product 34 is shaped from all sides simultaneously and the axial portion shifts continuously along the drill axis 2.

The semi-finished product 34 can be delivered to the second stand with a defined angular orientation. In the illustrated embodiment, the second stand is rotated by 45° relative to the first stand. The ridges 39 are in each case central or approximately central with respect to den roller surfaces. Thus, the second rolling tool 46 shapes one of the ridges 39. Accordingly, the number of second rolling tools 46 is equal to the number of ridges 39.

The rolling tools 46 have a shape analogous to a helically toothed gear wheel with a plurality of teeth 48. A head line 50 of the teeth 48 is inclined relative to the axis of rotation 49 of the rolling tools 46 by an angle of inclination. The angle of inclination is between 35° and 60° and is chosen according to the required helix pitch. The teeth 48 have, in contrast to a prismatic configuration, a head line 50 that is concavely curved in a circular shape. The curvature is approximately equal to the curvature of the helix base 14 to be produced. The height of the teeth 48 decreases monotonically along the axis of rotation from the margin to the center and then increases monotonically to the margin. During rolling, the teeth 48 are preferably in contact with the core 12 of the semi-finished product 34 without being reshaped. The second rolling tool 46 primarily shapes the material in the outer portion 43 of the ridges 39.

The invention claimed is:

1. A method for producing a twist drill having a helix which has a number (N) of helical ridges divided into helical segments extending in a helix pitch about a drill axis, the method comprising:

shaping a blank to form a semi-finished product, which comprises a core coaxial with the drill axis and having a radius and a number of ridges arranged on the core and having a height, and has a constant cross section along the drill axis, wherein the ridges have, adjoining the core, a first portion in which a width of the ridge remains constant or decreases in a circumferential direction with increasing radial distance from the drill axis, and, adjoining the first portion the ridges have a second portion in which the width of the ridge increases in the circumferential direction with increasing radial distance from the drill axis, the method further including shaping the ridges to form the helical ridges comprising the helical segments by using a plurality of rolling tools, that annularly enclose the semi-finished product and roll on the ridges along the drill axis, the rolling tools having teeth inclined relative to the drill axis, wherein the helical segments each have a height that is less than the height of the ridges, wherein the helical segments formed from adjacent ridges are in contact with one another in closing folds.

2. The method according to claim 1, wherein using the plurality of rolling tools, that annularly enclose the semi-finished product and roll on the ridges along the drill axis, form the helical ridges such that the helical segments formed from adjacent ridges are in contact with one another in closing folds and the closing folds lie in planes that contain the drill axis and are arranged centrally between adjacent ridges.

3. The method according to claim 1, wherein shaping the blank includes forming the semi-finished product such that in cross section a surface of the first portion is smaller than a surface of the second portion.

4. The method according to claim 1, wherein using the plurality of rolling tools, that annularly enclose the semi-finished product and roll on the ridges along the drill axis, form the helical ridges such that the height of the ridges is at least 20% greater and at most 100% greater than the height of the helical segments.

5. The method according to claim 1, wherein using the plurality of rolling tools, that annularly enclose the semi-finished product and roll on the ridges along the drill axis, form the helical ridges such that the helical ridges have a number of helix spines and the number of ridges is equal to or greater than the number of helix spines.

6. The method according to claim 2, wherein shaping the blank includes forming the semi-finished product such that in cross section a surface of the first portion is smaller than a surface of the second portion.

7. The method according to claim 2, wherein using the plurality of rolling tools, that annularly enclose the semi-finished product and roll on the ridges along the drill axis, form the helical ridges such that the height of the ridges is at least 20% greater and at most 100% greater than the height of the helical segments.

8. The method according to claim 3, wherein using the plurality of rolling tools, that annularly enclose the semi-finished product and roll on the ridges along the drill axis, form the helical ridges such that the height of the ridges is at least 20% greater and at most 100% greater than the height of the helical segments.

9. The method according to claim 2, wherein using the plurality of rolling tools, that annularly enclose the semi-finished product and roll on the ridges along the drill axis, form the helical ridges such that the helical ridges have a number of helix spines and the number of ridges is equal to or greater than the number of helix spines.

10. The method according to claim 3, wherein using the plurality of rolling tools, that annularly enclose the semi-finished product and roll on the ridges along the drill axis, form the helical ridges such that the helical ridges have a number of helix spines and the number of ridges is equal to or greater than the number of helix spines.

11. The method according to claim 4, wherein using the plurality of rolling tools, that annularly enclose the semi-finished product and roll on the ridges along the drill axis, form the helical ridges such that the helical ridges have a number of helix spines and the number of ridges is equal to or greater than the number of helix spines.

12. The method according to claim 6, wherein using the plurality of rolling tools, that annularly enclose the semi-finished product and roll on the ridges along the drill axis, form the helical ridges such that the height of the ridges is at least 20% greater and at most 100% greater than the height of the helical segments.

13. The method according to claim 6, wherein using the plurality of rolling tools, that annularly enclose the semi-finished product and roll on the ridges along the drill axis, form the helical ridges such that the helical ridges have a number of helix spines and the number of ridges is equal to or greater than the number of helix spines.

14. The method according to claim 7, wherein using the plurality of rolling tools, that annularly enclose the semi-finished product and roll on the ridges along the drill axis, form the helical ridges such that the helical ridges have a number of helix spines and the number of ridges is equal to or greater than the number of helix spines.

15. The method according to claim 8, wherein using the plurality of rolling tools, that annularly enclose the semi-finished product and roll on the ridges along the drill axis, form the helical ridges such that the helical ridges have a number of helix spines and the number of ridges is equal to or greater than the number of helix spines.

* * * * *